US012672599B2

(12) United States Patent
Johnson et al.

(10) Patent No.: US 12,672,599 B2
(45) Date of Patent: Jul. 7, 2026

(54) MOUNTING ASSEMBLY FOR A HOPPER OF AN AGRICULTURAL ROW UNIT

(71) Applicants:CNH Industrial America LLC, New Holland, PA (US); CNH Industrial Canada, Ltd., Saskatoon (CA)

(72) Inventors: Chad Michael Johnson, Arlington Heights, IL (US); Mayur Kishorchandra Joshi, Saskatoon (CA); Kregg J. Raducha, Oak Park, IL (US); Arun-Santosh Seetamsetti, Naperville, IL (US); Adam Hemmelgarn, Joliet, IL (US); Brian John Anderson, Yorkville, IL (US)

(73) Assignees: CNH Industrial America LLC, New Holland, PA (US); CNH Industrial Canada, Ltd., Saskatoon (CA)

( * ) Notice: Subject to any disclaimer, the term of this patent is extended or adjusted under 35 U.S.C. 154(b) by 339 days.

(21) Appl. No.: 18/435,096

(22) Filed: Feb. 7, 2024

(65) Prior Publication Data

US 2024/0268257 A1 Aug. 15, 2024

Related U.S. Application Data

(60) Provisional application No. 63/445,192, filed on Feb. 13, 2023.

(51) Int. Cl.
*A01C 7/06* (2006.01)
*A01C 7/20* (2006.01)
*A01C 15/00* (2006.01)

(52) U.S. Cl.
CPC .............. *A01C 15/006* (2013.01); *A01C 7/06* (2013.01); *A01C 7/201* (2013.01)

(58) Field of Classification Search
CPC .......... A01C 7/06; A01C 7/201; A01C 15/006
See application file for complete search history.

(56) References Cited

U.S. PATENT DOCUMENTS

| | | | | |
|---|---|---|---|---|
| 9,420,739 | B2 * | 8/2016 | Rollenhagen | ........ A01C 15/006 |
| 9,807,921 | B2 * | 11/2017 | Levy | ...................... A01C 7/127 |
| 9,832,924 | B2 * | 12/2017 | Anderson | ............ A01C 15/006 |
| 2021/0321558 | A1 | 10/2021 | Puichault et al. | |
| 2022/0142041 | A1 * | 5/2022 | Johnson | ............... A01C 15/006 |
| 2023/0232732 | A1 * | 7/2023 | Hartogh | ................. A01C 7/201 |
| | | | | 111/52 |

FOREIGN PATENT DOCUMENTS

| | | | |
|---|---|---|---|
| JP | 6635882 | 1/2018 | |
| KR | 20180000519 A | * 1/2018 | ............... A01C 7/08 |

* cited by examiner

*Primary Examiner* — Matthew R Buck
(74) *Attorney, Agent, or Firm* — Fletcher Yoder, P.C.

(57) ABSTRACT

A mounting assembly for a hopper of an agricultural row unit includes a mounting bracket configured to couple to one of the hopper or a frame of the agricultural row unit. The mounting bracket has a first recess and a second recess, the first recess is configured to engage a rod while the hopper is in an engagement position and in a mounting position, the second recess is configured to engage the rod while the hopper is in a mounted position, and the rod is configured to couple to the other of the hopper or the frame. In addition, the mounting assembly includes a support bracket configured to couple to one of the hopper or the frame. The support bracket includes a first protrusion and a second protrusion, and the first and second protrusions form a recess.

20 Claims, 6 Drawing Sheets

MOUNTING ASSEMBLY FOR A HOPPER OF AN AGRICULTURAL ROW UNIT

CROSS-REFERENCE TO RELATED APPLICATION

This application claims priority from and the benefit of U.S. Provisional Application Ser. No. 63/445,192, entitled "MOUNTING ASSEMBLY FOR A HOPPER OF AN AGRICULTURAL ROW UNIT", filed Feb. 13, 2023, which is hereby incorporated by reference in its entirety.

BACKGROUND

The present disclosure relates generally to a mounting assembly for a hopper of an agricultural row unit.

Generally, planting implements (e.g., planters) are towed behind a tractor or other work vehicle. Planting implements typically include multiple row units distributed across a width of the implement. Each row unit is configured to deposit agricultural product (e.g., seed, fertilizer, etc.) at a desired depth beneath the soil surface of a field, thereby establishing rows of planted agricultural product. For example, each row unit typically includes a ground engaging tool or opener that forms a trench for agricultural product deposition into the soil. An agricultural product conveying system (e.g., agricultural product tube or powered agricultural product conveyor) is configured to deposit agricultural product (e.g., seed, fertilizer, etc.) into the trench. The opener/agricultural product conveying system may be followed by closing discs that move displaced soil back into the trench and/or a packer wheel that packs the soil on top of the deposited agricultural product.

Each row unit of the planting implement may include an agricultural product meter (e.g., vacuum agricultural product meter, etc.) configured to control a flow rate of the agricultural product (e.g., seed, fertilizer, etc.) to the agricultural product conveying system, thereby establishing a desired distribution of the agricultural product throughout the field. In certain row unit configurations, the agricultural product meter is coupled to a hopper configured to store the agricultural product, and the hopper/agricultural product meter assembly is coupled to a frame of the row unit. As the size of hoppers increase, the weight of the hopper/agricultural product meter assembly also increases. Accordingly, the process of coupling the hopper/agricultural product meter assembly to the frame of the row unit while properly aligning an outlet of the agricultural product meter with an inlet of the agricultural product conveying system may be difficult.

BRIEF DESCRIPTION

In certain embodiments, a mounting assembly for a hopper of an agricultural row unit includes a mounting bracket configured to couple to one of the hopper or a frame of the agricultural row unit. The mounting bracket has a first recess and a second recess, the first recess is configured to engage a rod while the hopper is in an engagement position and in a mounting position, the second recess is configured to engage the rod while the hopper is in a mounted position, and the rod is configured to couple to the other of the hopper or the frame. In addition, the mounting assembly includes a support bracket configured to couple to one of the hopper or the frame. The support bracket includes a first protrusion and a second protrusion, the first and second protrusions form a recess, the first protrusion is configured to contact a mount while the hopper is in the mounting position, the second protrusion is configured to enable the hopper to rotate about the rod from the engagement position to the mounting position, the first and second protrusions are configured to contact the mount to block rotation of the hopper about the rod while the hopper is in the mounted position, and the mount is configured to couple to the other of the hopper or the frame.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
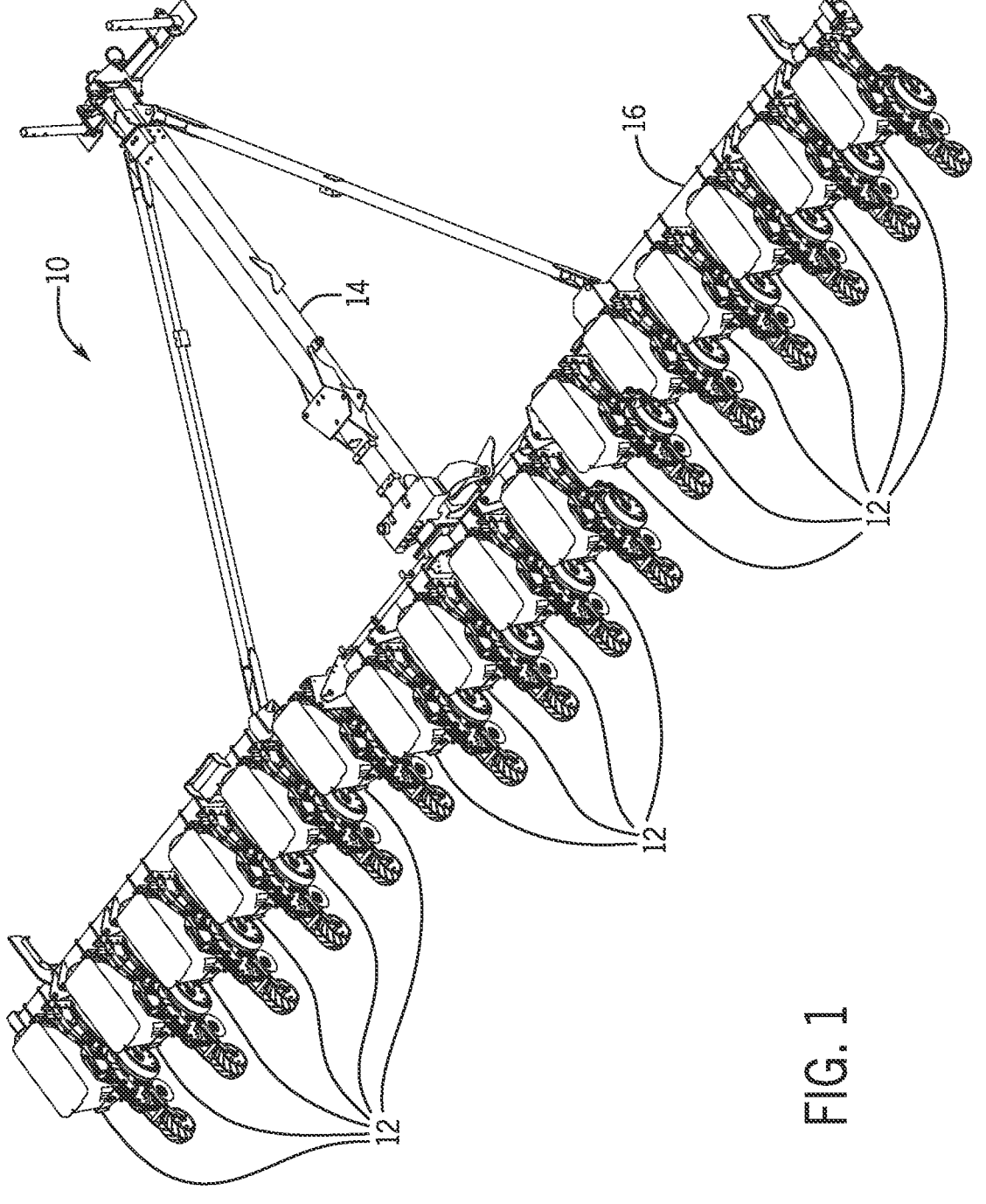
FIG. 1 is a perspective view of an embodiment of an agricultural implement having multiple row units distributed across a width of the agricultural implement.

FIG. 1 is a perspective view of an embodiment of an agricultural implement 10 (e.g., planting implement) having multiple row units 12 distributed across a width of the agricultural implement 10. The implement 10 is configured to be towed through a field behind a work vehicle, such as a tractor. As illustrated, the implement 10 includes a tongue assembly 14, which includes a hitch configured to couple the implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a trench within soil of a field. The row unit 12 may also include an agricultural product conveying system (e.g., agricultural product tube or powered agricultural product conveyer) configured to deposit agricultural product (e.g., seed, fertilizer, etc.) into the trench. In addition, the row unit 12 may include closing disc(s) and/or a packer wheel positioned behind the agricultural product conveying system. The closing disc(s) are configured to move displaced soil back into the trench, and the packer wheel is configured to pack soil on top of the deposited agricultural product.

As discussed in detail below, each row unit 12 of the agricultural implement 10 includes an agricultural product meter (e.g., vacuum agricultural product meter) and a hopper. The agricultural product meter is configured to control a flow rate of the agricultural product (e.g., seed, fertilizer, etc.) to the agricultural product conveying system, thereby controlling the flow rate of the agricultural product into the trench. As a result, a desired distribution of the agricultural product throughout the field (e.g., a desired seed spacing along a respective seed row) may be established.

In certain embodiments, at least one row unit 12 of the agricultural implement 10 includes a mounting assembly configured to couple the hopper to a frame of the row unit. As discussed in detail below, the mounting assembly includes a mounting bracket and a support bracket. The mounting bracket is coupled to the hopper, and the mounting bracket has a first recess and a second recess. The first recess is configured to engage a rod of the row unit while the hopper is in an engagement position and in a mounting position, and the second recess is configured to engage the rod while the hopper is in a mounted position. Furthermore, the support bracket includes a first protrusion and a second protrusion, which form a recess. The first protrusion is configured to contact a mount of the row unit while the hopper is in the mounting position, and the second protrusion is configured to enable the hopper to rotate about the rod from the engagement position to the mounting position. In addition, the first and second protrusions are configured to contact the mount to block rotation of the hopper about the rod while the hopper is in the mounted position. As discussed in detail below, a portion of the weight of the hopper and the agricultural product meter is supported by the first protrusion during a process of aligning an outlet of the agricultural product meter with an inlet of the agricultural product conveying system. Accordingly, the difficulty/effort associated with coupling the hopper to the row unit frame may be substantially reduced (e.g., as compared to lowering the hopper directly onto mounts while aligning the outlet of the agricultural product meter with the inlet of the agricultural product conveying system).

Figure 2:
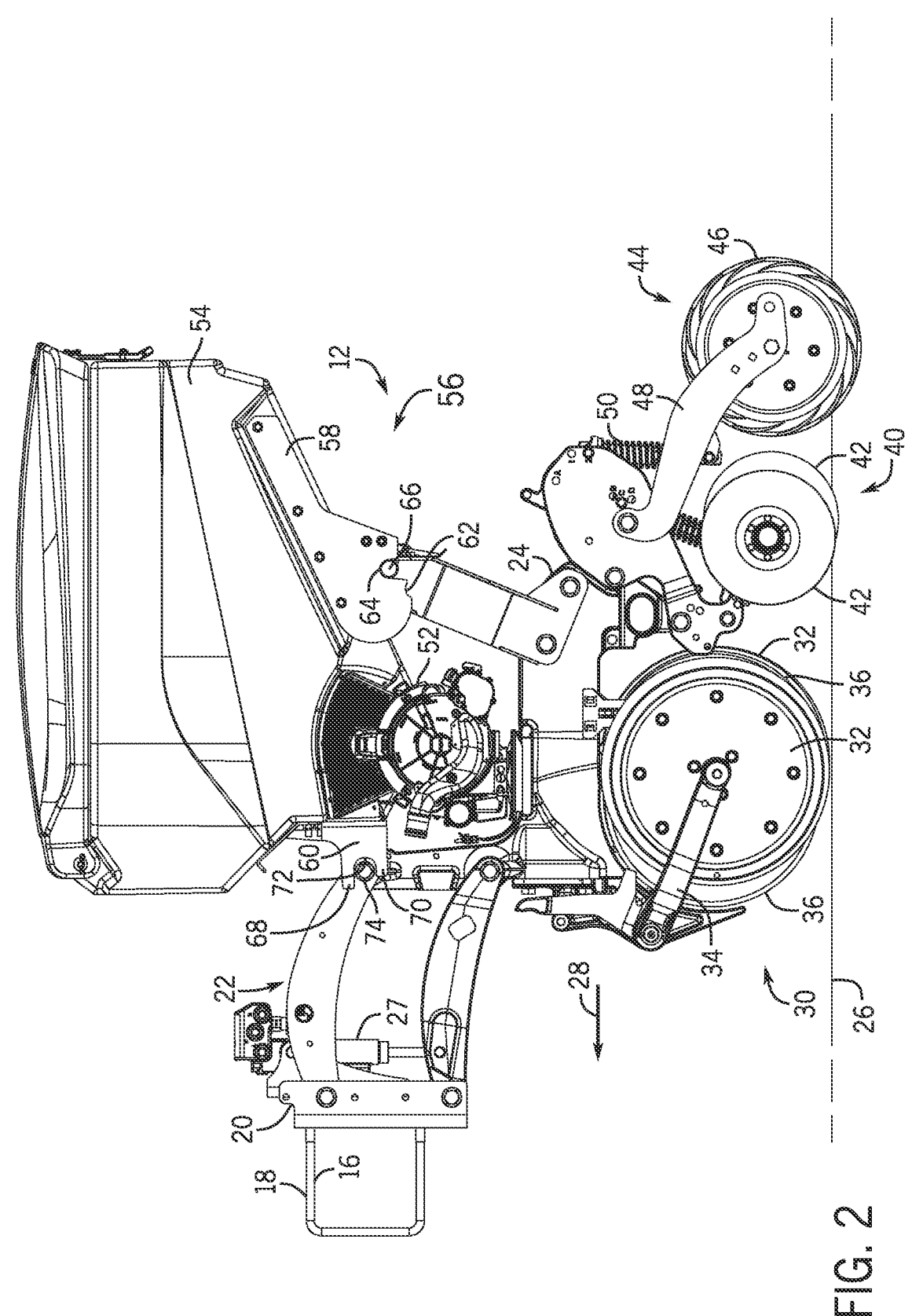
FIG. 2 is a side view of an embodiment of a row unit that may be employed on the agricultural implement of FIG. 1, in which the row unit includes an embodiment of a mounting assembly.

FIG. 2 is a side view of an embodiment of a row unit 12 (e.g., agricultural row unit) that may be employed on the agricultural implement of FIG. 1, in which the row unit 12 includes an embodiment of a mounting assembly. The row unit 12 includes a mount 18 configured to secure the row unit 12 to the tool bar 16 of the agricultural implement. In the illustrated embodiment, the mount 18 includes a U-bolt that secures a bracket 20 of the row unit 12 to the tool bar 16. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar 16 in response to variations in a soil surface 26. In the illustrated embodiment, an actuator 27 (e.g., hydraulic actuator, pneumatic actuator, electromechanical actuator, etc.) is configured to urge the frame 24 toward the soil surface 26. While the illustrated linkage assembly 22 is a parallel linkage assembly (e.g., a four-bar linkage assembly), in other embodiments, another suitable linkage assembly may extend between the bracket and the frame.

The row unit 12 is configured to deposit agricultural product (e.g., seed, fertilizer, etc.) at a target depth beneath the soil surface 26 as the row unit 12 traverses a field along a direction of travel 28. The row unit 12 includes an opener assembly 30 that forms a trench in the soil for agricultural product deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate a trench into the soil, and the gauge wheels 32 are configured to control a penetration depth of the opener discs 36 into the soil. In certain embodiments, the row unit 12 includes a depth control system configured to control the vertical position of the gauge wheels 32 (e.g., by blocking rotation of the arms in the upward direction beyond a selected orientation), thereby controlling the penetration depth of the opener discs 36 into the soil. While the opener assembly 30 includes opener discs 36 in the illustrated embodiment, in other embodiments, the opener assembly may include any other suitable opener(s) (e.g., knife blade opener(s), coulter(s), etc.) configured to form the trench in the soil.

The row unit 12 also includes an agricultural product conveying system (e.g., seed tube or powered agricultural product conveyor) configured to deposit agricultural product (e.g., seed, fertilizer, etc.) into the trench. The opener assembly 30 and the agricultural product conveying system are followed by a closing assembly 40 that moves displaced soil back into the trench. In the illustrated embodiment, the closing assembly 40 includes two closing discs 42. However, in other embodiments, the closing assembly may include other suitable closing device(s) (e.g., a single closing disc, etc.). In addition, in certain embodiments, the closing assembly may be omitted. In the illustrated embodiment, the closing assembly 40 is followed by a packing assembly 44 configured to pack soil on top of the deposited agricultural product. The packing assembly 44 includes a packer wheel 46, an arm 48 that pivotally couples the packer wheel 46 to the frame 24, and a biasing member 50 configured to urge the packer wheel 46 toward the soil surface 26, thereby enabling the packer wheel to pack soil on top of the deposited agricultural product. While the illustrated biasing member 50 includes a spring, in other embodiments, the biasing member may include another suitable biasing device, such as a hydraulic cylinder or a pneumatic cylinder, among others. Furthermore, in certain embodiments, the packing assembly may be omitted.

The row unit 12 includes an agricultural product meter 52 configured to receive agricultural product (e.g., seeds, fertilizer, etc.) from a hopper 54. In the illustrated embodiment, the agricultural product meter 52 includes a vacuum seed meter, which includes a disc having multiple openings. An air pressure differential between opposite sides of the disc induces the agricultural product (e.g., seeds, fertilizer, etc.) to be captured within the openings. As the disc rotates, the agricultural product is conveyed toward the agricultural product conveying system. When the agricultural product (e.g., seed, fertilizer, etc.) is aligned with an inlet of the agricultural product conveying system, the air pressure on each side of the disc is substantially equalized (e.g., at the end of a vacuum passage), thereby enabling the agricultural product (e.g., seed, fertilizer, etc.) to enter the agricultural product conveying system (e.g., agricultural product tube or powered agricultural product conveyor). The agricultural product conveying system then directs the agricultural product to the trench. While the agricultural product meter includes a vacuum seed meter in the illustrated embodiment, in other embodiments, other suitable agricultural product meters may be utilized. As used herein, "vacuum" refers to an air pressure that is less than the ambient atmospheric air pressure, and not necessarily 0 pa.

To assemble the row unit 12, the agricultural product meter 52 is coupled to the hopper 54 to form a hopper/agricultural product meter assembly, and the hopper/agricultural product meter assembly is then coupled to the frame 24 of the row unit 12. In the illustrated embodiment, the row unit 12 includes a mounting assembly 56 configured to couple the hopper 54 to the frame 24. As discussed in detail below, the mounting assembly 56 includes a mounting bracket 58 and a support bracket 60. The mounting bracket 58 is coupled to the hopper 54, and the mounting bracket 58 has a first recess 62 and a second recess 64. The first recess 62 is configured to engage a rod 66 of the row unit 12 while the hopper is in an engagement position and in a mounting position, and the second recess 64 is configured to engage the rod 66 while the hopper is in a mounted position. As illustrated, the rod 66 is coupled to the frame 24 of the row unit 12. Furthermore, the support bracket 60 includes a first protrusion 68 and a second protrusion 70, which form a recess 72. The first protrusion 68 is configured to contact a mount 74 of the row unit 12 while the hopper 54 is in the mounting position, and the second protrusion 70 is configured to enable the hopper 54 to rotate about the rod 66 from the engagement position to the mounting position. As illustrated, the mount 74 is coupled to the frame 24 of the row unit 12. In addition, the first and second protrusions are configured to contact the mount 74 to block rotation of the hopper 54 about the rod 66 while the hopper is in the mounted position.

To couple the hopper 54, with the agricultural product meter 52 attached, to the frame 24, the first recess 62 of the mounting bracket 58 may be engaged with the rod 66, thereby positioning the hopper 54 in the engagement position. The hopper 54 may then be rotated about the rod 66 from the engagement position to the mounting position, in which the first protrusion 68 contacts the mount 74. Next, the hopper 54 may be slightly rotated about a contact point between the first protrusion 68 of the support bracket 60 and the mount 74 to an angle sufficient to disengage the first recess 62 of the mounting bracket 58 from the rod 66. The hopper 54 may then be moved toward the mount 74, such that the mount 74 engages the recess 72 of the support bracket 60. While a portion of the weight of the hopper/agricultural product meter assembly is supported by the first protrusion 68 of the support bracket 60, the hopper 54 may be moved to align an outlet of the agricultural product meter 52 with an inlet of the agricultural product conveying system. The hopper 54 may then be rotated about the mount 74, such that the rod 66 engages the second recess 64. Because a portion of the weight of the hopper/agricultural product meter assembly is supported by the first protrusion 68 during the agricultural product meter outlet/agricultural product conveying system inlet alignment process, the difficulty/effort associated with coupling the hopper/agricultural product meter assembly to the frame may be substantially reduced (e.g., as compared to lowering the hopper/agricultural product meter assembly directly onto mounts while aligning the outlet of the agricultural product meter with the inlet of the agricultural product conveying system).

Figure 3:
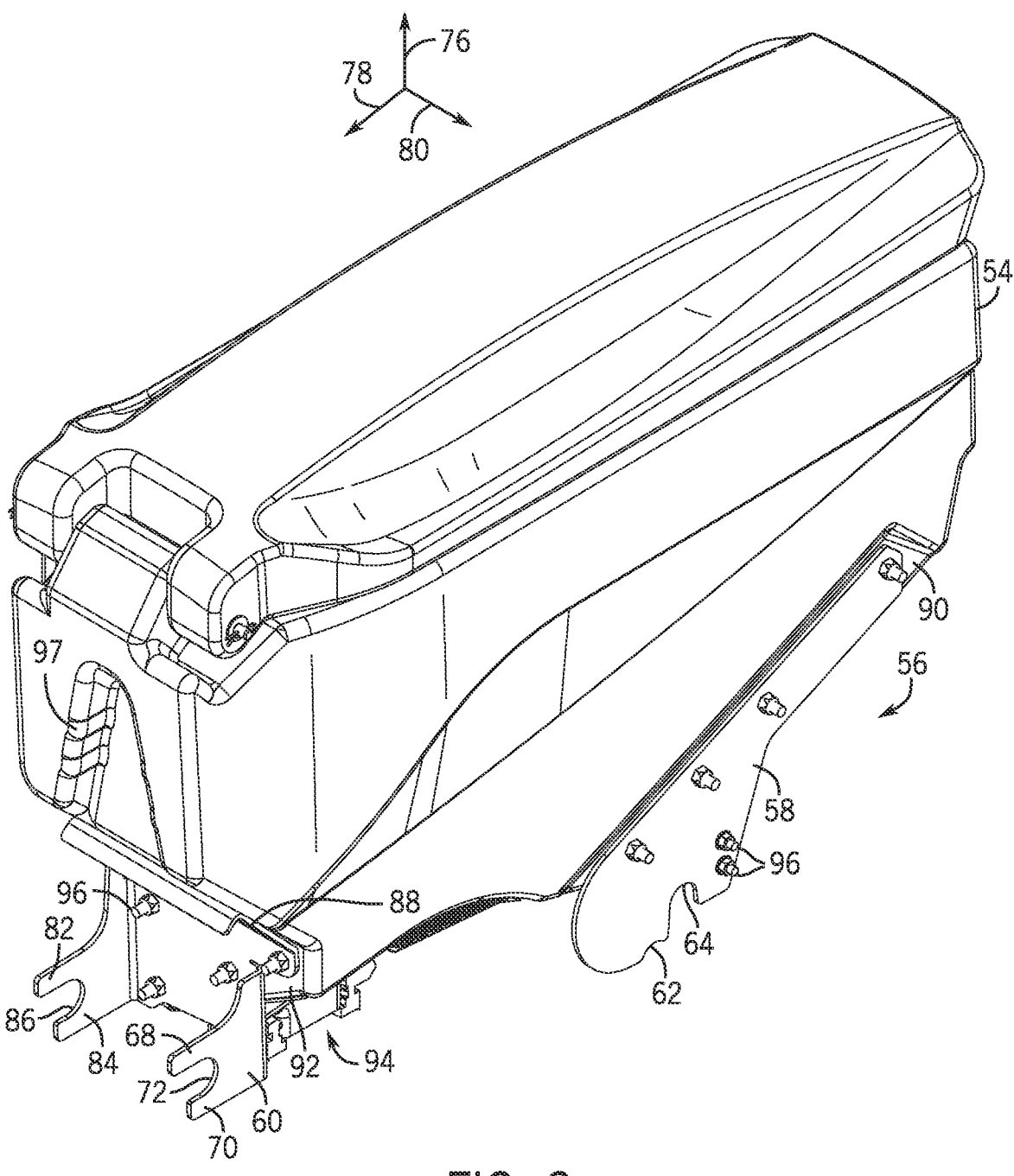
FIG. 3 is a perspective view of a portion of the mounting assembly of FIG. 2.

FIG. 3 is a perspective view of a portion of the mounting assembly 56 of FIG. 2. As previously discussed, the first recess 62 of the mounting bracket 58 is configured to engage the rod of the row unit while the hopper 54 is in the engagement position and in the mounting position. In addition, the second recess 64 is configured to engage the rod while the hopper 54 is in the mounted position. In the illustrated embodiment, the mounting bracket 58 includes a flat plate, and the first and second recesses are formed in the flat plate. However, in other embodiments, the mounting bracket may include any other suitable structure(s) (e.g., multiple flat plates, one or more cast elements, one or more three-dimensionally printed elements, one or more machined elements, etc.). Furthermore, in the illustrated embodiment, a first depth (e.g., extent with respect to a vertical axis 76 of the row unit) of the first recess 62 is less than a second depth (e.g., extent with respect to the vertical axis 76) of the second recess 64. However, in other embodiments, the depths of the first and second recesses may be equal to one another, or the first depth of the first recess may be greater than the second depth of the second recess. As discussed in detail below, engagement of the second recess 64 with the rod while the hopper 54 is in the mounted position aligns the outlet of the agricultural product meter with the inlet of the agricultural product conveying system with respect to a longitudinal axis 78 of the row unit.

In the illustrated embodiment, the mounting assembly 56 includes a second mounting bracket coupled to the hopper 54. The second mounting bracket has a first recess and a second recess, and the first recess is configured to engage a second rod of the row unit while the hopper is in the engagement position and in the mounting position. The second rod is coupled to the frame of the row unit. In addition, the second recess is configured to engage the second rod while the hopper is in the mounted position. In the illustrated embodiment, the mounting brackets are positioned on opposite lateral sides of the hopper 54 (e.g., opposite sides with respect to a lateral axis 80 of the row unit). As a result, the lateral stability of the hopper may be enhanced while the hopper is in the engagement position, in the mounting position, and in the mounted position. In certain embodiments, the second mounting bracket includes a flat plate, and the first and second recesses are formed in the flat plate. However, in other embodiments, the second mounting bracket may include any other suitable structure(s) (e.g., multiple flat plates, one or more cast elements, one or more three-dimensionally printed elements, one or more machined elements, etc.). Furthermore, in certain embodiments, a first depth (e.g., extent with respect to the vertical axis 76) of the first recess is less than a second depth (e.g., extent with respect to the vertical axis 76) of the second recess. However, in other embodiments, the depths of the first and second recesses may be equal to one another, or the first depth of the first recess may be greater than the second depth of the second recess. While the mounting brackets are positioned on opposite lateral sides of the hopper in the illustrated embodiment, in other embodiments, the mounting brackets may be located in other suitable positions relative to the hopper. Furthermore, while the mounting assembly includes two mounting brackets in the illustrated embodiment, in other embodiments, the mounting assembly may include more or fewer mounting brackets (e.g., 1, 3, 4, or more). In embodiments having multiple mounting brackets, the row unit may include a corresponding number of rods. The rods may be spaced apart from one another, in contact with one another, coupled to one another, integrally formed with one another, or a combination thereof.

As previously discussed, the first protrusion 68 of the support bracket 60 is configured to contact the mount of the agricultural row unit while the hopper 54 is in the mounting position. In addition, the second protrusion 70 is configured to enable the hopper 54 to rotate about the rod(s) from the engagement position to the mounting position, and the first and second protrusions are configured to contact the mount to block rotation of the hopper about the rod(s) while the hopper is in the mounted position. In the illustrated embodiment, the support bracket 60 includes a third protrusion 82 and a fourth protrusion 84, and the third and fourth protrusions form a second recess 86. The third protrusion 82 is configured to contact a second mount of the agricultural row unit while the hopper 54 is in the mounting position, and the fourth protrusion 84 is configured to enable the hopper 54 to rotate about the rod(s) from the engagement position to the mounting position. In addition, the third and fourth protrusions are configured to contact the second mount to block rotation of the hopper 54 about the rod(s) while the hopper 54 is in the mounted position. In the illustrated embodiment, the first recess 72 formed by the first and second protrusions is laterally spaced apart from the second recess 86 formed by the third and fourth protrusions, thereby enhancing the lateral stability of the hopper 54 while the hopper is in the mounting position and in the mounted position. While the support bracket includes four protrusions in the illustrated embodiment, in other embodiments, the support bracket may include more or fewer protrusions (e.g., 2, 3, 5, 6, 7, 8, 9, 10, or more). Furthermore, while the mounting assembly 56 includes one support bracket 60 in the illustrated embodiment, in other embodiments, the mounting assembly may include additional support brackets (e.g., 1, 2, 3, 4, or more additional support brackets), and each support bracket may have at least one protrusion (e.g., at least two protrusions forming at least one recess).

In the illustrated embodiment, each recess of the support bracket 60 is configured to establish a longitudinal gap (e.g., gap with respect to the longitudinal axis 78) between the support bracket 60 and the respective mount while the hopper 54 is in the mounted position. As previously discussed, engagement of the second recess of each mounting bracket with the respective rod while the hopper 54 is in the mounted position aligns the outlet of the agricultural product meter with the inlet of the agricultural product conveying system with respect to the longitudinal axis 78. The longitudinal gap between the support bracket 60 and each mount facilitates longitudinal dimensional variations of the hopper (e.g., in embodiments in which the hopper is formed by a rotational molding process).

In the illustrated embodiment, the support bracket 60 includes a support flange 88. The support flange 88 contacts a longitudinal end of the hopper 54 while the support bracket 60 is coupled to the hopper 54. The support flange 88 is configured to distribute a longitudinal contact force between the support flange 88 and the hopper 54 over a larger area (e.g., resulting from rapid deceleration of the agricultural implement), thereby reducing the stress on the hopper 54. While the support bracket 60 includes the support flange 88 in the illustrated embodiment, in other embodiments, the support flange may be omitted.

In certain embodiments, the hopper 54 may be formed by a rotational molding process. As a result, certain dimensions of the hopper 54 may vary from target dimensions. Accordingly, in the illustrated embodiment, each bracket is engaged with a respective mounting surface that is substantially flat and substantially vertical. As illustrated, the mounting bracket 58 (e.g., first mounting bracket) is engaged with a first mounting surface 90 of the hopper 54, and the support bracket 60 is engaged with a second mounting surface 92 of the hopper 54. In addition, the second mounting bracket is engaged with a third mounting surface of the hopper. Because each bracket is engaged with a respective mounting surface that is substantially flat and substantially vertical, each bracket may be accurately positioned along the respective mounting surface with respect to an outlet 94 of the hopper 54, as discussed in detail below. As used herein, "substantially vertical" refers to a surface that extends along the vertical axis 76 or is oriented less than a threshold angle relative to the vertical axis 76 (e.g., less than 10 degrees, 5 degrees, 3 degrees, 2 degrees, 1 degree, or 0.5 degrees relative to the vertical axis 76). Furthermore, as used herein, "substantially flat" refers to a surface having a maximum dimensional variation less than a threshold value (e.g., less than 5 mm, less than 4 mm, less than 3 mm, less than 2 mm, less than 1 mm, less than 0.5 mm, or less than 0.1 mm).

In the illustrated embodiment, each bracket is coupled to the hopper by a fastener connection having fasteners 96. The fasteners 96 may include bolts, screws, rivets, other suitable type(s) of fasteners, or a combination thereof. The hopper 54 has openings extending through the mounting surfaces, and each opening is configured to receive a respective fastener. Accordingly, the mounting bracket 58 is coupled to the hopper 54 at the first mounting surface 90 via fasteners 96 that extend through openings in the first mounting surface 90, the support bracket 60 is coupled to the hopper 54 at the second mounting surface 92 via fasteners 96 that extend through openings in the second mounting surface 92, and the second mounting bracket is coupled to the hopper at the third mounting surface via fasteners that extend through openings in the third mounting surface.

Each opening is accurately positioned with respect to the outlet 94 of the hopper 54 to accurately locate each bracket. In the illustrated embodiment, each opening through the first mounting surface 90 and the third mounting surface is accurately formed (e.g., drilled, machined, laser cut, etc.) at a target longitudinal position with respect to the outlet 94 of the hopper 54, thereby accurately positioning the mounting brackets relative to the outlet 94 of the hopper 54 with respect to the longitudinal axis 78. Accordingly, engagement of the second recess of each mounting bracket with the respective rod while the hopper 54 is in the mounted position accurately positions the outlet 94 of the hopper 54 relative to the row unit frame with respect to the longitudinal axis 78. Because the agricultural product meter is coupled to the hopper 54 at the outlet 94, accurately positioning the outlet 94 of the hopper 54 relative to the row unit frame with respect to the longitudinal axis 78 accurately aligns the outlet of the agricultural product meter with the inlet of the agricultural product conveying system with respect to the longitudinal axis 78. Furthermore, each opening through the second mounting surface 92 is accurately formed (e.g., drilled, machined, laser cut, etc.) at a target vertical position with respect to the outlet 94 of the hopper 54, thereby accurately positioning the support bracket 60 relative to the outlet 94 of the hopper 54 with respect to the vertical axis 76. Accordingly, engagement of the first and second recesses of the support bracket 60 with the respective mounts while the hopper 54 is in the mounted position accurately positions the outlet 94 of the hopper 54 relative to the row unit frame with respect to the vertical axis 76. Because the agricultural product meter is coupled to the hopper 54 at the outlet 94, accurately positioning the outlet 94 of the hopper 54 relative to the row unit frame with respect to the vertical axis 76 accurately aligns the outlet of the agricultural product meter with the inlet of the agricultural product conveying system with respect to the vertical axis 76.

In certain embodiments, the openings may be formed by placing the hopper in a jig, such that the outlet of the hopper is engaged with a mounting feature of the jig. The jig may include apertures that enable a tool to form the openings in the hopper at the locations of the apertures. Furthermore, in certain embodiments, the openings may be formed by a computer controlled tool that forms the openings based on a determined location of the outlet of the hopper.

While each bracket is coupled to the hopper by a fastener connection in the illustrated embodiment, in certain embodiments, at least one bracket may be coupled to the hopper via other suitable type(s) of connection(s) (e.g., alone or in combination with the fastener connection), such as an adhesive connection, a welded connection (e.g., via ultrasonic welding, etc.), other suitable type(s) of connection(s), or a combination thereof. In embodiments in which at least one bracket is not coupled to the hopper by a fastener connection, the bracket may be accurately positioned along the respective mounting surface (e.g., by a robotic tool) and coupled to the hopper. For example, each mounting bracket may be accurately positioned along the respective mounting surface relative to the hopper outlet with respect to the longitudinal axis, and/or the support bracket may be accurately positioned along the respective mounting surface relative to the hopper outlet with respect to the vertical axis. While a rotationally molded hopper is disclosed above, in certain embodiments, the hopper may be formed by another suitable process, such as injection molding, compression molding, stamping, etc. In certain embodiments, the hopper may have sufficient dimensional accuracy to enable the brackets to be engaged with surfaces that are not substantially vertical and/or not substantially flat. Furthermore, in certain embodiments, the brackets may be integrally formed with the hopper (e.g., via an injection molding process, via a stamping process, etc.).

Figure 7:
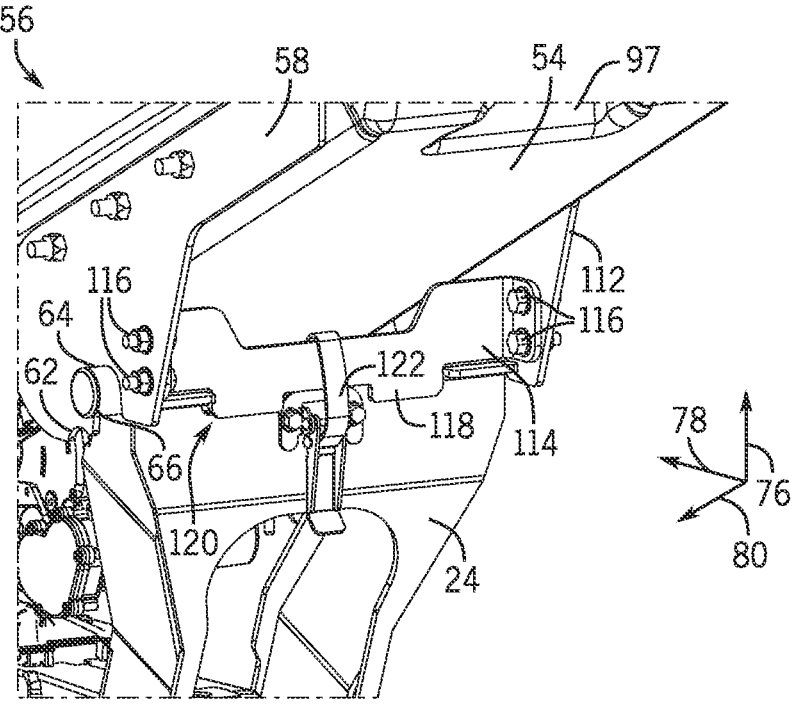
FIG. 7 is a perspective view of a portion of the mounting assembly of FIG. 2.

In the illustrated embodiment, the hopper 54 includes integrally molded handles 97 configured to facilitate carrying the hopper 54 and moving the hopper 54 between positions. The integrally molded handles 97 are positioned on a front side of the hopper and on a rear side of the hopper, as shown in FIG. 7. While the hopper includes two integrally molded handles in the illustrated embodiment, in other embodiments, the hopper may include more or fewer integrally molded handles (e.g., 0, 1, 3, 4, 5, 6, or more). For example, in certain embodiments, the integrally molded handles may be omitted. Furthermore, in certain embodiments, the hopper may include one or more handles (e.g., alone or in combination with the integrally molded handle (s)) coupled to a body of the hopper.

Figure 4:
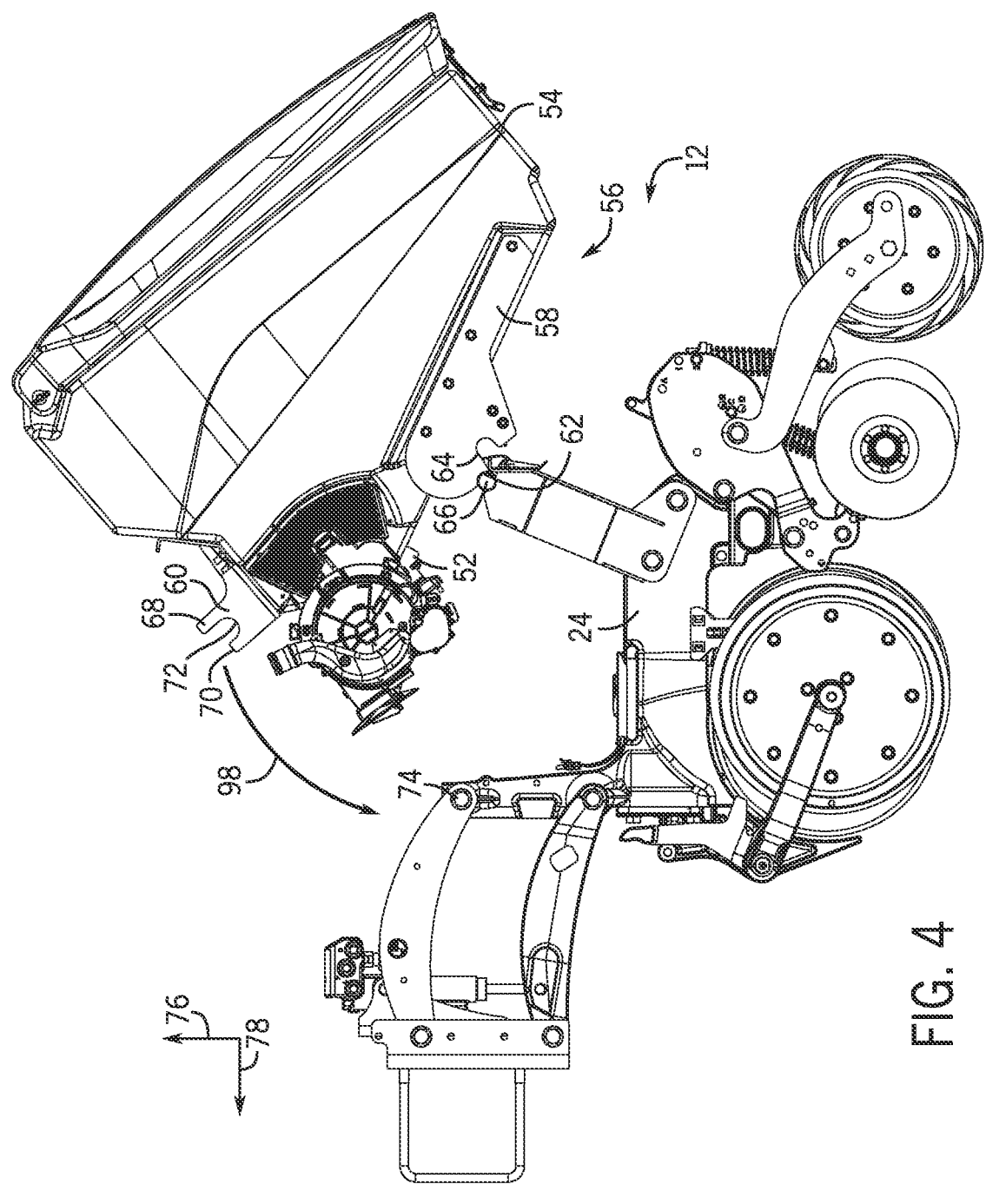
FIG. 4 is a side view of the row unit of FIG. 2, in which a hopper is in an engagement position.

FIG. 4 is a side view of the row unit 12 of FIG. 2, in which the hopper 54 is in the engagement position. To couple the hopper 54, with the agricultural product meter 52 attached, to the frame 24 of the row unit 12, the hopper 54 may be carried to the row unit frame 24 (e.g., via handles integrally molded into the hopper 54). The first recess 62 of the mounting bracket 58 (e.g., first mounting bracket) may be engaged with the rod 66 (e.g., first rod), and the first recess of the second mounting bracket may be engaged with the second rod, thereby positioning the hopper 54 in the illustrated engagement position. The hopper 54 may then be rotated in a first rotational direction 98 about the rods from the illustrated engagement position to the mounting position, in which the first protrusion 68 of the support bracket 60 contacts the mount 74 (e.g., first mount), and the third protrusion of the support bracket contacts the second mount.

As previously discussed, the second protrusion 70 and the fourth protrusion are configured to enable the hopper 54 to rotate in the first rotational direction 98 about the rods from the illustrated engagement position to the mounting position. In the illustrated embodiment, the second protrusion 70 is shorter than the first protrusion 68, and the fourth protrusion is shorter than the third protrusion, thereby enabling the hopper 54 to rotate to the mounting position, in which the first and third protrusions contact the respective mounts. While the lower protrusion (e.g., second protrusion, fourth protrusion) is shorter than the upper protrusion (e.g., first protrusion, third protrusion) in the illustrated embodiment, in other embodiments, at least one lower protrusion may be the same length or longer than the respective upper protrusion(s). In such embodiments, the lower protrusion(s) may have shape(s) that enable the hopper to rotate in the first rotational direction from the engagement position to the mounting position.

Figure 5:
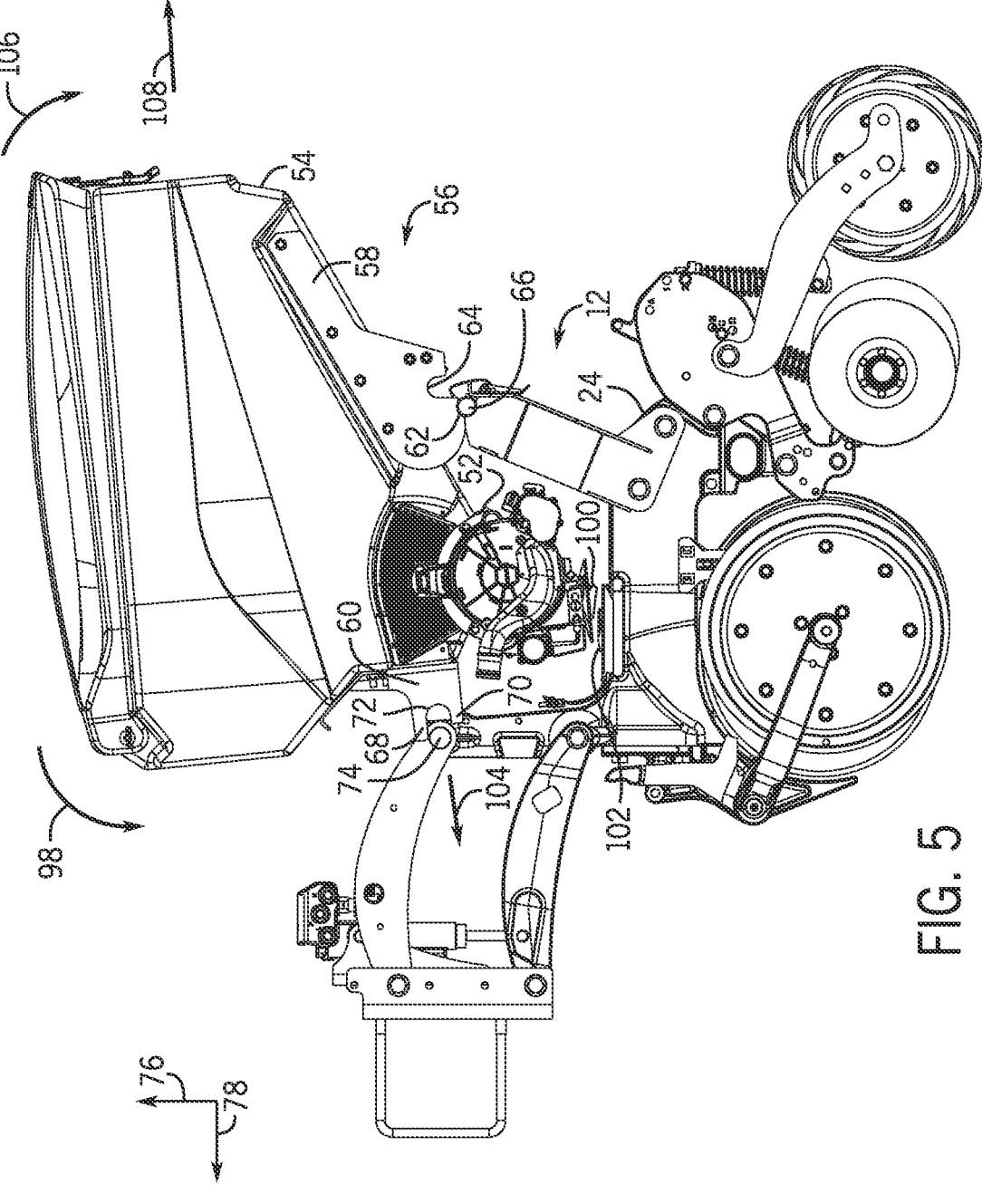
FIG. 5 is a side view of the row unit of FIG. 2, in which the hopper is in a mounting position.

FIG. 5 is a side view of the row unit 12 of FIG. 2, in which the hopper 54 is in the mounting position. With the hopper 54 in the illustrated mounting position, the first recess 62 of the mounting bracket 58 (e.g., first mounting bracket) is engaged with the rod 66 (e.g., first rod), the first recess of the second mounting bracket is engaged with the second rod, the first protrusion 68 of the support bracket 60 contacts the mount 74 (e.g., first mount), and the third protrusion of the support bracket contacts the second mount. In addition, an outlet 100 of the agricultural product meter 52 is spaced apart from an inlet 102 of the agricultural product conveying system. To continue the hopper mounting process, the hopper 54 may be slightly rotated in the first rotational direction 98 about contact points between the first and third protrusions of the support bracket 60 and the respective mounts to an angle sufficient to disengage the first recesses of the mounting brackets from the respective rods. The hopper 54 may then be moved toward the mounts in a first translational direction 104, such that the mounts engage the respective recesses of the support bracket 60. While a portion of the weight of the hopper/agricultural product meter assembly is supported by the first protrusion 68 and the third protrusion, the hopper 54 may be moved to align the outlet 100 of the agricultural product meter 52 with the inlet 102 of the agricultural product conveying system. The hopper 54 may then be rotated in a second rotational direction 106 about the mounts, such that the rods engage the second recesses of the mounting plates. Because a portion of the weight of the hopper/agricultural product meter assembly is supported by the first protrusion 68 and the third protrusion during the agricultural product meter outlet/agricultural product conveying system inlet alignment process, the difficulty/effort associated with coupling the hopper/agricultural product meter assembly to the frame may be substantially reduced (e.g., as compared to lowering the hopper/agricultural product meter assembly directly onto mounts while aligning the outlet of the agricultural product meter with the inlet of the agricultural product conveying system).

Furthermore, the hopper 54 may be moved from the mounted position to the illustrated mounting position to facilitate maintenance operations on the agricultural product meter 52 and/or the agricultural product conveying system (e.g., the powered agricultural product conveyor). To move the hopper 54 from the mounted position to the mounting position, the hopper may be rotated in the first rotational direction 98 about the mounts to disengage the second recesses of the mounting brackets from the rods. The hopper 54 may then be translated away from the mounts along a second translational direction 108 while a portion of the weight of the hopper/agricultural product meter assembly is supported by the first and third protrusions of the support bracket 60. The hopper 54 may be rotated in the second rotational direction 106, such that the first recesses of the mounting brackets engage the respective rods. Once the hopper is in the mounting position, the agricultural product meter cover, which may be blocked by the agricultural product conveying system (e.g., the powered agricultural product conveyor) while the hopper is in the mounted position, may be removed to facilitate maintenance operations and/or reconfiguration of the agricultural product meter (e.g., replacing the disc, replacing the singulator, clearing a blockage, etc.). Additionally, moving the hopper to the mounting position may move the agricultural product meter away from an opening in the agricultural product conveying system (e.g., the powered agricultural product conveyor), thereby facilitating access to an interior of the agricultural product conveying system. Accordingly, maintenance operations and/or reconfiguration of the agricultural product conveying system may be performed (e.g., replace feeder wheel (s), clear a blockage, etc.).

Figure 6:
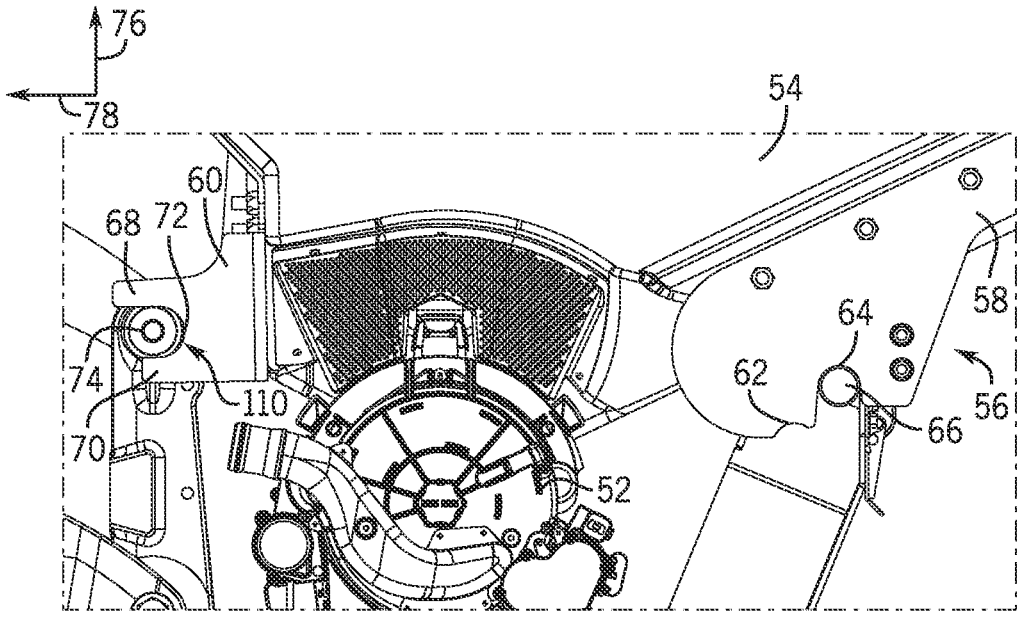
FIG. 6 is a side view of a portion of the row unit of FIG. 2, in which the hopper is in a mounted position.

FIG. 6 is a side view of a portion of the row unit 12 of FIG. 2, in which the hopper 54 is in the mounted position. As previously discussed, the mounting bracket 58 (e.g., the first mounting bracket) and the second mounting bracket are accurately positioned relative to the outlet of the hopper 54 with respect to the longitudinal axis 78 (e.g., by accurately positioning each opening through the first mounting surface and the third mounting surface). Accordingly, engagement of the second recess of each mounting bracket with the respective rod while the hopper 54 is in the illustrated mounted position accurately positions the outlet of the hopper 54 relative to the row unit frame with respect to the longitudinal axis 78. Because the agricultural product meter 52 is coupled to the hopper 54 at the outlet of the hopper, accurately positioning the outlet of the hopper 54 relative to the row unit frame with respect to the longitudinal axis 78 accurately aligns the outlet of the agricultural product meter with the inlet of the agricultural product conveying system with respect to the longitudinal axis 78.

Furthermore, as previously discussed, the support bracket 60 is accurately positioned relative to the outlet of the hopper 54 with respect to the vertical axis 76 (e.g., by accurately positioning each opening through the second mounting surface). Accordingly, engagement of the first and second recesses of the support bracket 60 with the respective mounts while the hopper 54 is in the illustrated mounted position accurately positions the outlet of the hopper 54 relative to the row unit frame with respect to the vertical axis 76. Because the agricultural product meter 52 is coupled to the hopper 54 at the outlet of the hopper, accurately positioning the outlet of the hopper 54 relative to the row unit frame with respect to the vertical axis 76 accurately aligns the outlet of the agricultural product meter with the inlet of the agricultural product conveying system with respect to the vertical axis 76.

As previously discussed, the recess 72 (e.g., first recess) of the support bracket 60 is configured to establish a longitudinal gap 110 (e.g., gap with respect to the longitudinal axis 78) between the support bracket 60 and the mount 74 (e.g., first mount) while the hopper 54 is in the illustrated mounted position. In addition, the second recess of the support bracket is configured to establish a longitudinal gap (e.g., gap with respect to the longitudinal axis) between the support bracket and the second mount while the hopper is in the illustrated mounted position. The longitudinal gaps between the support bracket 60 and the mounts facilitates longitudinal dimensional variations of the hopper (e.g., in embodiments in which the hopper is formed by a rotational molding process).

FIG. 7 is a perspective view of a portion of the mounting assembly 56 of FIG. 2. As previously discussed, the mounting assembly 56 includes the first mounting bracket 58 and the second mounting bracket 112. The mounting brackets are positioned on opposite lateral sides of the hopper 54 (e.g., opposite sides with respect to the lateral axis 80). As a result, the lateral stability of the hopper 54 may be enhanced while the hopper is in the engagement position, in the mounting position, and in the illustrated mounted position. In the illustrated embodiment, the mounting assembly 56 includes a crossbar 114 extending between the first mounting bracket 58 and the second mounting bracket 112. In addition, the crossbar 114 is coupled to the first mounting bracket 58 and the second mounting bracket 112. In the illustrated embodiment, the crossbar 114 is coupled to each bracket by a respective fastener connection having fasteners 116 (e.g., bolts, screws, rivets, etc.). However, in other embodiments, the crossbar may be coupled to at least one mounting bracket via other suitable type(s) of connection(s) (e.g., alone or in combination with the fastener connection), such as an adhesive connection, a welded connection, a press-fit connection, other suitable type(s) of connection(s), or a combination thereof.

In the illustrated embodiment, the crossbar 114 has an alignment feature 118 configured to engage a corresponding alignment feature 120 of the frame 24 of the row unit to laterally align the hopper 54 with the frame 24. Because the crossbar 114 is coupled to the first mounting bracket 58 and to the second mounting bracket 112, the spacing between the mounting brackets at the crossbar 114 is controlled by the lateral extent (e.g., extent with respect to the lateral axis 80) of the crossbar 114 (e.g., as compared to the lateral spacing between the first and third mounting surfaces). In addition, the alignment feature 118 of the crossbar 114 is positioned at the lateral center (e.g., center with respect to the lateral axis 80) of the crossbar 114, and the corresponding alignment feature 120 of the frame 24 is positioned at the lateral center (e.g., center with respect to the lateral axis 80) of the frame 24. Accordingly, engagement of the alignment feature 118 of the crossbar 114 with the corresponding alignment feature 120 of the frame 24 laterally aligns the hopper 54 with the row unit frame 24. Laterally aligning the hopper 54 with the frame 24 accurately positions the outlet of the hopper 54 relative to the row unit frame 24 with respect to the lateral axis 80. Because the agricultural product meter is coupled to the hopper 54 at the outlet of the hopper, accurately positioning the outlet of the hopper 54 relative to the row unit frame 24 with respect to the lateral axis 80 accurately aligns the outlet of the agricultural product meter with the inlet of the agricultural product conveying system with respect to the lateral axis 80.

In the illustrated embodiment, the alignment feature 118 of the crossbar 114 includes two protrusions, and the corresponding alignment feature 120 of the frame 24 includes a single recess. However, in other embodiments, the alignment feature of the crossbar may include more or fewer protrusions, and the corresponding alignment feature of the frame may include respective recess(es). Furthermore, in certain embodiments, the alignment feature of the crossbar may include one or more recesses, and the corresponding alignment feature of the frame may include respective protrusion(s). In addition, in certain embodiments, the alignment feature of the crossbar may include any other suitable type(s) of alignment element(s), and the corresponding alignment feature of the frame may include respective alignment element(s). While the crossbar includes the alignment feature in the illustrated embodiment, in other embodiments, other suitable element(s) of the mounting assembly may include the alignment feature (e.g., alone or in combination with the crossbar), such as the support bracket. For example, in certain embodiments, the protrusions of the support bracket may be configured to contact the row unit frame to laterally align the hopper with the frame.

In the illustrated embodiment, the mounting assembly 56 includes a latch 122 configured to selectively couple the crossbar 114 to the frame 24 of the row unit. For example, the latch 122 may be engaged after transitioning the hopper 54 to the illustrated mounted position, thereby coupling the hopper 54 to the frame 24. In addition, the latch 122 may be disengaged to enable the hopper 54 to transition from the illustrated mounted position to the mounting position. In the illustrated embodiment, the latch is coupled to the frame and configured to engage the crossbar. However, in other embodiments, the latch may be coupled to the crossbar and configured to engage the frame. Furthermore, while the mounting assembly has one latch in the illustrated embodiment, in other embodiments, the mounting assembly may include more or fewer latches (e.g., 0, 2, 3, 4, or more). For example, in certain embodiments, the latch may be omitted. In addition, while the latch is configured to selectively couple the crossbar to the row unit frame in the illustrated embodiment, in other embodiments, the latch or an additional latch may selectively couple another suitable component of the mounting assembly (e.g., a mounting bracket, the support bracket, etc.) or the hopper to the row unit frame. In certain embodiments, the mounting assembly may include other suitable device(s) (e.g., alone or in combination with the latch(es)) configured to selectively couple the hopper to the row unit frame, such as magnet(s), fastener(s), clamp(s), other suitable device(s), or a combination thereof.

While the mounting assembly includes a single crossbar in the illustrated embodiment, in other embodiments, the mounting assembly may include more or fewer crossbars (e.g., 0, 2, 3, 4, or more). For example, in certain embodiments, the crossbar may be omitted. While each mounting bracket has two recesses in the illustrated embodiment, in other embodiments, each mounting bracket may have a single recess. In such embodiments, the lower protrusions of the support bracket may be the same length/configuration as the upper protrusions. To couple the hopper to the frame of the row unit, the recesses of the support bracket may be engaged with the mounts, and the hopper may be rotated to engage the recesses of the mounting brackets with the respective rods.

While the mounting bracket(s) and the support bracket are coupled to the hopper and the rod(s), and the mount(s) are coupled to the row unit frame in the embodiments disclosed above, in certain embodiments, the mounting bracket(s) may be coupled to the frame, and the rod(s) may be coupled to the hopper, and/or the support bracket may be coupled to the frame, and the mount(s) may be coupled to the hopper. For example, in certain embodiments, the mounting bracket(s) and the support bracket may be coupled to the frame, and the rod(s) and the mount(s) may be coupled to the hopper. Furthermore, in certain embodiments, the mounting bracket (s) and the mount(s) may be coupled to the frame, and the rod(s) and the support bracket may be coupled to the hopper. In addition, in certain embodiments, the rod(s) and the support bracket may be coupled to the frame, and the mounting bracket(s) and the mount(s) may be coupled to the hopper.

In embodiments in which the rod(s) are coupled to the hopper, each rod may be accurately positioned relative to the hopper outlet with respect to the longitudinal axis (e.g., via a rod mounting bracket engaged with a mounting surface of the hopper). Furthermore, in embodiments in which the mount(s) are coupled to the hopper, each mount may be accurately positioned relative to the hopper outlet with respect to the vertical axis (e.g., via a mount mounting bracket engaged with a mounting surface of the hopper). In addition, in embodiments in which the mount(s) are coupled to the hopper, and the support bracket is coupled to the frame, each lower protrusion (e.g., first protrusion, third protrusion) is configured to contact the respective mount while the hopper is in the mounting position, and each upper protrusion (e.g., second protrusion, fourth protrusion) is configured to enable the hopper to rotate about the rod(s) from the engagement position to the mounting position. For example, the upper protrusions (e.g., second protrusion, fourth protrusion) may be shorter than the lower protrusions (e.g., first protrusion, third protrusion). Furthermore, in embodiments in which multiple mounting brackets are coupled to the row unit frame, the crossbar may extend between the mounting brackets, and the crossbar may be coupled to the mounting brackets. In such embodiments, the latch may couple the crossbar to the hopper (e.g., via a latch engagement feature on the hopper). In addition, the alignment feature of the crossbar may engage a corresponding alignment feature of the hopper to laterally align the hopper with the frame.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A mounting assembly for a hopper of an agricultural row unit, comprising:

a mounting bracket coupled to one of the hopper or a frame of the agricultural row unit, wherein the mounting bracket has a first recess and a second recess, the first recess is configured to engage a rod while the hopper is in an engagement position and in a mounting position, the second recess is configured to engage the rod while the hopper is in a mounted position, and the rod is coupled to the other of the hopper or the frame; and a support bracket coupled to one of the hopper or the frame, wherein the support bracket comprises a first protrusion and a second protrusion, the first and second protrusions form a recess, the first protrusion is configured to contact a mount while the hopper is in the mounting position, the second protrusion is configured to enable the hopper to rotate about the rod from the engagement position to the mounting position, the first and second protrusions are configured to contact the mount to block rotation of the hopper about the rod while the hopper is in the mounted position, and the mount is coupled to the other of the hopper or the frame.

2. The mounting assembly of claim 1, wherein a first depth of the first recess is less than a second depth of the second recess.

3. The mounting assembly of claim 1, wherein the mounting bracket comprises a flat plate, and the first and second recesses are formed in the flat plate.

4. The mounting assembly of claim 1, comprising a second mounting bracket configured to couple to one of the hopper or the frame, wherein the second mounting bracket has a first recess and a second recess, the first recess of the second mounting bracket is configured to engage a second rod while the hopper is in the engagement position and in the mounting position, the second recess of the second mounting bracket is configured to engage the second rod while the hopper is in the mounted position, and the second rod is configured to couple to the other of the hopper or the frame.

5. The mounting assembly of claim 4, comprising a crossbar, wherein the mounting bracket and the second mounting bracket are configured to couple to the hopper, the crossbar extends between the mounting bracket and the second mounting bracket, and the crossbar is coupled to the mounting bracket and the second mounting bracket.

6. The mounting assembly of claim 5, comprising a latch configured to selectively couple the crossbar to the frame.

7. The mounting assembly of claim 5, wherein the crossbar comprises an alignment feature configured to engage a corresponding alignment feature of the frame to laterally align the hopper with the frame.

8. The mounting assembly of claim 1, wherein the recess of the support bracket is configured to establish a longitudinal gap between the support bracket and the mount while the hopper is in the mounted position.

9. A row unit of an agricultural implement, comprising:
a hopper having a plurality of mounting surfaces, wherein each mounting surface of the plurality of mounting surfaces is substantially flat and substantially vertical; and
a mounting assembly configured to couple the hopper to a frame of the row unit, wherein the mounting assembly comprises:
a mounting bracket coupled to the hopper and engaged with a first mounting surface of the plurality of mounting surfaces, wherein the mounting bracket has a first recess and a second recess, the first recess is configured to engage a rod of the agricultural row unit while the hopper is in an engagement position and in a mounting position, and the second recess is configured to engage the rod while the hopper is in a mounted position; and
a support bracket coupled to the hopper and engaged with a second mounting surface of the plurality of mounting surfaces, wherein the support bracket comprises a first protrusion and a second protrusion, the first and second protrusions form a recess, the first protrusion is configured to contact a mount of the agricultural row unit while the hopper is in the mounting position, the second protrusion is configured to enable the hopper to rotate about the rod from the engagement position to the mounting position, and the first and second protrusions are configured to contact the mount to block rotation of the hopper about the rod while the hopper is in the mounted position.

10. The row unit of claim 9, comprising a plurality of fasteners configured to couple the mounting bracket and the support bracket to the hopper, wherein the hopper has a plurality of openings extending through the plurality of mounting surfaces, each opening of the plurality of openings is configured to receive a respective fastener of the plurality of fasteners, and the plurality of openings are positioned with respect to an outlet of the hopper.

11. The row unit of claim 9, wherein the mounting bracket comprises a flat plate, and the first and second recesses are formed in the flat plate.

12. The row unit of claim 9, wherein the mounting assembly comprises a second mounting bracket coupled to the hopper and engaged with a third mounting surface of the plurality of mounting surfaces, the second mounting bracket has a first recess and a second recess, the first recess of the second mounting bracket is configured to engage a second rod of the agricultural row unit while the hopper is in the engagement position and in the mounting position, and the second recess of the second mounting bracket is configured to engage the second rod while the hopper is in the mounted position.

13. The row unit of claim 12, wherein the mounting assembly comprises a crossbar extending between the mounting bracket and the second mounting bracket, and the crossbar is coupled to the mounting bracket and the second mounting bracket.

14. The row unit of claim 13, wherein the crossbar comprises an alignment feature configured to engage a corresponding alignment feature of the frame of the agricultural row unit to laterally align the hopper with the frame.

15. The row unit of claim 9, wherein the recess of the support bracket is configured to establish a longitudinal gap between the support bracket and the mount while the hopper is in the mounted position.

16. A method of manufacturing an agricultural row unit, comprising:
coupling a mounting bracket of a mounting assembly to a hopper at a first mounting surface of a plurality of mounting surfaces, wherein the mounting bracket has a first recess and a second recess, the first recess is configured to engage a rod of the agricultural row unit while the hopper is in an engagement position and in a mounting position, and the second recess is configured to engage the rod while the hopper is in a mounted position; and
coupling a support bracket of the mounting assembly to the hopper at a second mounting surface of the plurality of mounting surfaces, wherein the support bracket comprises a first protrusion and a second protrusion, the first and second protrusions form a recess, the first protrusion is configured to contact a mount of the agricultural row unit while the hopper is in the mounting position, the second protrusion is configured to enable the hopper to rotate about the rod from the engagement position to the mounting position, and first and second protrusions are configured to contact the mount to block rotation of the hopper about the rod while the hopper is in the mounted position;

wherein each mounting surface of the plurality of mounting surfaces is substantially flat and substantially vertical.

17. The method of claim 16, comprising forming a plurality of openings through the plurality of mounting surfaces at respective positions with respect to an outlet of the hopper, wherein the mounting bracket and the support bracket are coupled to the hopper via engaging a plurality of fasteners with the plurality of openings.

18. The method of claim 16, comprising coupling a second mounting bracket of the mounting assembly to the hopper at a third mounting surface of the plurality of mounting surfaces, wherein the second mounting bracket has a first recess and a second recess, the first recess of the second mounting bracket is configured to engage a second rod of the agricultural row unit while the hopper is in the engagement position and in the mounting position, and the second recess of the second mounting bracket is configured to engage the second rod while the hopper is in the mounted position.

19. The method of claim 18, comprising coupling a crossbar to the mounting bracket and the second mounting bracket, such that the crossbar extends between the mounting bracket and the second mounting bracket.

20. The method of claim 16, wherein the recess of the support bracket is configured to establish a longitudinal gap between the support bracket and the mount while the hopper is in the mounted position.

* * * * *